Dec. 26, 1967 J. C. WYGANT ET AL 3,360,546
PURIFICATION OF HYDROXYALKYL FUMARATE ESTERS
Filed Sept. 16, 1963
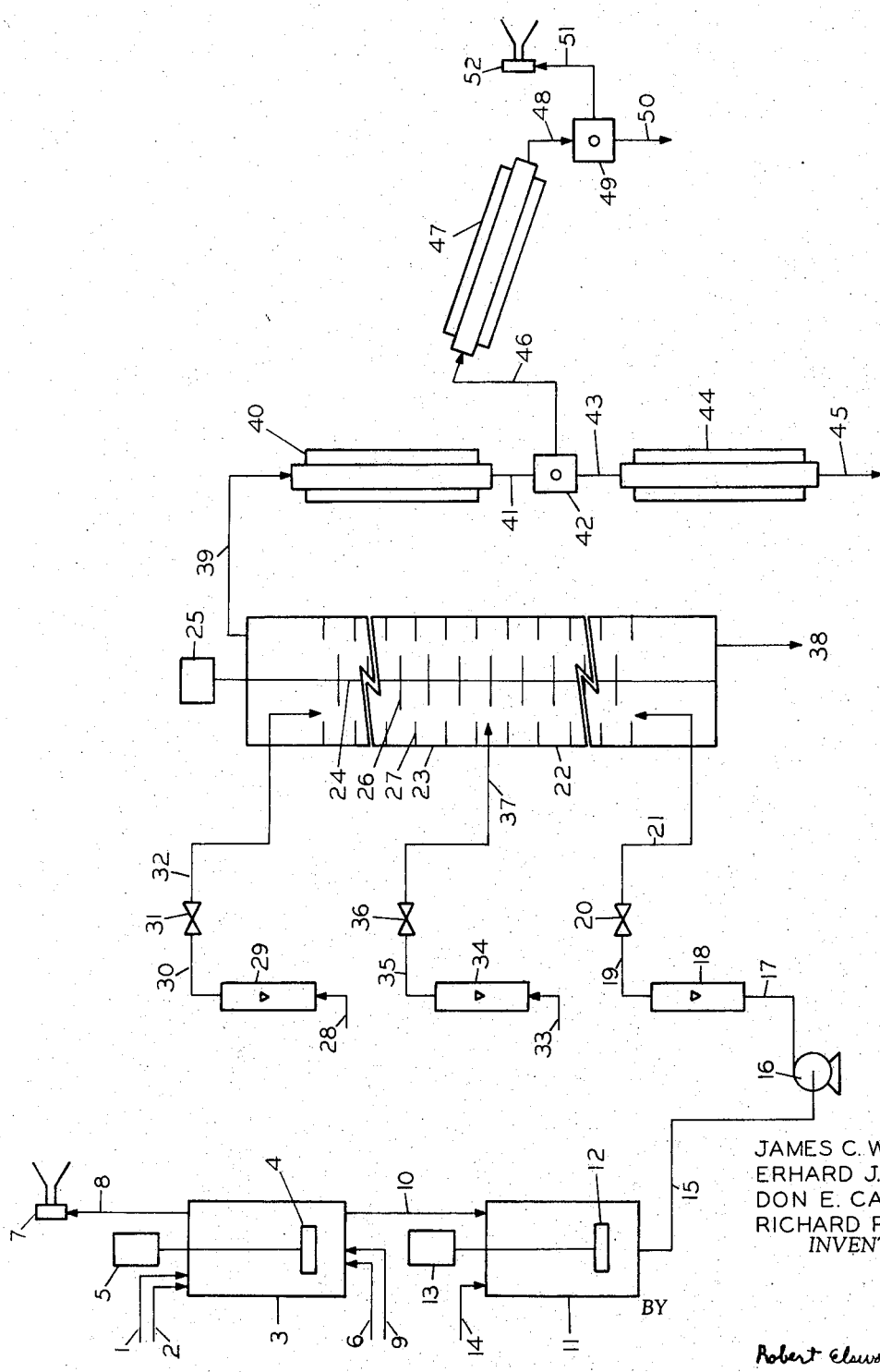
JAMES C. WYGANT
ERHARD J. PRILL
DON E. CARTER
RICHARD R. KUCIA
INVENTORS
BY Robert Ellsworth Lee
ATTORNEY United States Patent Office 3,360,546
Patented Dec. 26, 1967

3,360,546
PURIFICATION OF HYDROXYALKYL
FUMARATE ESTERS
James C. Wygant, Creve Coeur, and Erhard J. Prill, Don
E. Carter, and Richard R. Kucia, St. Louis, Mo., assignors to Monsanto Company, a corporation of Delaware
Filed Sept. 16, 1963, Ser. No. 309,152
12 Claims. (Cl. 260—485)

This invention relates to a method for purifying hydroxyalkyl fumarate esters. This method has particular application for effecting a substantial purification of crude hydroxyalkyl fumarate esters produced by the alkylene oxide reaction.

"Hydroxyalkyl fumarate esters" are diesters of fumaric acid where one or both of the ester functions have a free hydroxyl group and include the bis(hydroxyalkyl) fumarates and the alkyl hydroxyalkyl fumarates.

The alkyl portions of the fumarate ester molecules whether unsubstituted alkyl or hydroxyalkyl may be straight-chained, branched, or cyclic and usually have ten or fewer carbon atoms and preferably no more than five carbons. In the hydroxyalkyl groups the hydroxyl function is generally located in the "two" (i.e., beta) position.

Some examples of the more desirable hydroxyalkyl fumarate esters include: bis(2-hydroxypropyl)fumarate, ethyl 2-hydroxyethyl fumarate, bis(2-hydroxyethyl)fumarate, bis(2-hydroxybutyl)fumarate, ethyl 2-hydroxypropyl fumarate, ethyl 2-hydroxybutyl fumarate, methyl 2-hydroxyethyl fumarate, isopropyl 2-hydroxyethyl fumarate, n-butyl 2-hydroxyethyl fumarate, etc.

Hydroxyalkyl fumarate esters are particularly desirable monomers as they can be copolymerized with vinyl chloride and like compounds to form polymers having free hydroxyl groups which provide sites for crosslinking and other reactions. Such polymers find application in surface coating and molding applications.

The hydroxyalkyl fumarate esters can be prepared by several processes however for our purposes generally are obtained by reaction of an alkylene oxide with fumaric acid or an alkyl hydrogen fumarate. For example alkylene oxide, preferably in the presence of a catalyst, reacts with fumaric acid or alkyl hydrogen fumarate to form bis(2-hydroxyalkyl)fumarate and alkyl 2-hydroxyalkyl fumarate respectively.

However prepared the hydroxyalkyl fumarate esters generally contain unreacted acidic components, e.g., alkyl hydrogen fumarate, which have an adverse effect on stability of the hydroxyalkyl fumarate ester copolymers. The presence of even trace amounts of acidity in the hydroxyalkyl fumarate ester monomer results in discolored polymers having decreased heat and light stability.

Residual catalytic materials are also often present in the hydroxyalkyl fumarate esters and desirably are removed prior to polymerization. Prime examples include the alkali metal and alkaline earth metal salts of the alkyl hydrogen fumarates, etc.

These crude hydroxyalkyl fumarate esters are very difficult to purify. Removal of the residual acidic material by distillation is difficult, expensive, and unattractive as a commercial process. Precipitation and adsorption procedures seem to result in little improvement in the quality of the hydroxyalkyl fumarate esters. Various methods have been tried for inactivating the contaminants in the crude hydroxyalkyl fumarate esters to improve their quality for use as monomers, however, these processes at best have proved only partially effective.

It is an object of the present invention to provide a process for effecting substantial purification of crude hydroxyalkyl fumarate esters.

Another object of this invention is to provide a process for separating residual acidic components from hydroxyalkyl fumarate esters.

Another object is to provide a process effective for removing both unreacted acidic components and residual catalytic materials from crude hydroxyalkyl fumarate esters.

Another object is to provide a process for purifying hydroxyalkyl fumarates which have been prepared by the alkylene oxide reaction.

Another object is to provide a process for producing "monomer grade" hydroxyalkyl fumarate esters.

Another object is to provide a process for separating hydroxyalkyl fumarate esters from contaminants and impurities without causing hydrolysis or disproportionation of the hydroxyalkyl fumarate esters.

Another object is to provide a process for purifying hydroxyalkyl fumarate esters which can be accomplished with minimum loss of hydroxyalkyl fumarate esters in the purifying operations.

Another object is to provide a continuous process for purifying hydroxyalkyl fumarate esters.

According to the present invention crude hydroxyalkyl fumarate esters can be greatly improved in quality on washing with a basic aqueous solution under carefully controlled pH conditions. The processes which comprise this invention can be carried out as a batch operation or run as a continuous process.

The drawing illustrates the continuous process and will be discussed subsequently.

Batch process

The basic extractant should have a buffer value from about eight to twelve and preferably from about eight to ten on the pH scale. Suitable extractants include aqueous solutions of disodium hydrogen phosphate, trisodium phosphate, sodium pyrophosphate, sodium salts of polyphosphoric acid, sodium carbonate, sodium bicarbonate, sodium tetraborate, etc. Other alkali metal salts, e.g., potassium salts, corresponding to the above and also the corresponding ammonium salts are equally satisfactory. Buffers of ammonium hydroxide with ammonium salts of strong acids, e.g., ammonium chloride, can be used as the extractant. Likewise other inorganic salts, bases or combinations thereof which have the desired buffer action are within the scope of this invention. On the basis of cost and overall performance disodium hydrogen phosphate is the preferred buffer.

On the other hand extractants more weakly basic or those more strongly basic than those shown are generally unsuitable. Where the wash solution has a pH value below about eight the acidic components are not effectively removed. Where the pH of the extractant is higher than about twelve, e.g., aqueous solutions of sodium hydroxide or potassium hydroxide, the hydroxyalkyl fumarate ester tends to saponify and/or disproportionate.

The concentration of buffer in the basic wash solution should be about five to fifty weight percent. Wash solutions more concentrated are less effective extractants and solutions less concentrated are undesirable because of increased loss of hydroxyalkyl fumarate ester due to solubility in the aqueous phase. Preferably the buffer concentration is maintained within a range from about ten to twenty-five weight percent in order to achieve maximum separation of impurities with minimum loss of product.

The minimum amount of basic wash solution required in the purifying operation is that necessary to neutralize the acidic components present in the crude product, i.e., an equivalent amount. Any amount of base in excess of this value can be used, however, generally no more than about two equivalents of basic wash is employed. Where the buffer concentration is in the preferred range as a rule about one and one-third equivalents of base is used.

The term "equivalency" as used here has the usual meaning, i.e., the amount of the base required to react with one gram-ionic weight of hydrogen ion (1.008 grams). Thus, if $RCO_2H$ is used to represent the unreacted acidic contaminant, the following equations are representative of the neutralization which occurs:

1. $RCO_2H + Na_2HPO_4 \rightarrow RCO_2Na + NaH_2PO_4$;
   eq.wt.=mol.wt.
2. $RCO_2H + NaHCO_3 \rightarrow RCO_2Na + CO_2 + R_2O$;
   eq.wt.=mol.wt.
3. $2RCO_2H + Na_2CO_3 \rightarrow 2RCO_2Na + CO_2 + H_2O$;
   eq.wt.=mol.wt./2
4. $RCO_2H + Na_2B_4O_7 \rightarrow RCO_2Na + NaHB_4O_7$;
   eq.wt.=mol.wt.
5. $2RCO_2H + Na_4P_2O_7 \rightarrow 2RCO_2Na + Na_2H_2P_2O_7$;
   eq.wt.+mol.wt./2.
6. $2RCO_2H + Na_3PO_4 \rightarrow 2RCO_2Na + NaH_2PO_4$;
   eq.wt.=mol.wt./2

Extraction with suitable basic solutions, i.e., bases having a pH range from about eight to twelve, provide hydroxyalkyl fumarate esters relatively free of acidic components and residual catalytic materials; however, some hydroxyalkyl fumarate ester is lost due to its water solubility. These losses are minimized by adding a solvent for the hydroxyalkyl fumarate ester to the hydroxyalkyl fumarate ester phase which solvent is inert and substantially immiscible with water.

Examples of solvents which are suitable for use herein include e.g., benzene, toluene; alcohols, e.g., isobutyl alcohol, amyl alcohol, cyclohexanol, etc.; ethers, e.g., diethyl ether, diisopropyl ether, di-n-butyl ether, etc.; organic halides, e.g., ethylene dichloride, methylene chloride, carbon tetrachloride, etc.; ketones, e.g., methyl isopropyl ketone, methyl isobutyl ketone, methyl isoamyl ketone, diisopropyl ketone, etc.; and other common organic solvents which desirably have a water solubility of less than about fifteen weight percent and preferably of less than about five percent.

The solvent for the hydroxyalkyl fumarate ester can be used in whatever amount desired, whether less than the weight of the crude hydroxyalkyl fumarate ester or in considerable excess thereof. In practice generally about ninety to ten weight percent solutions of the unpurified hydroxyalkyl fumarate ester are used. Preferably the fumarate solution contains from about seventy-five to twenty-five weight percent fumarate ester.

After extraction with basic wash the hydroxyalkyl fumarate ester phase (i.e., the hydroxyalkyl fumarate ester plus solvent, if any) is desirably washed with about one tenth to ten times its weight with water to assure nearly complete removal of the water soluble fumaric salts. Preferably the water is divided in several portions and the hydroxyalkyl fumarate ester phase is washed with the individual portions—this provides better extraction per given volume of wash solution. Usually the aqueous wash is divided in two substantially equal portions.

To reduce loss of hydroxyalkyl fumarate ester due to water solubility, an aqueous solution of an inorganic salt in the above stated quantity is used for washing purposes instead of pure water. Use of salt washes also tends to prevent emulsion formation which can be very troublesome.

For this same reason it is sometimes desirable to use a special basic wash consisting of about equal weight portions of buffer and salt solution and then follow this with one or more washings of salt water.

Salt solutions whether added to the buffer solution or used as separate washes generally contain about two to fifteen weight percent salt in water. Usually about three to eight weight percent salt solutions are employed.

Preferably potassium chloride or sodium chloride is used to prepare the salt solutions. However, any water soluble salt of a strong acid and a strong base is suitable, e.g., potassium bromide, rubidium chloride, lithium chloride, calcium nitrate, strontium nitrate, etc.

Optimum conditions for preventing loss of hydroxyalkyl fumarate ester during the washing operations are attained by using the later aqueous wash phases from previous runs as early wash solutions in subsequent runs, instead of pure water or the salt water.

*Continuous process*

Except where specified otherwise all extractants, solvents, conditions, proportions, preferred ranges, etc., presented under "Batch Process" are equally intended to apply to continuous processes for purifying hydroxyalkyl fumarates.

The accompanying drawing shows a continuous system for manufacturing hydroxyalkyl fumarate esters from alkyl hydrogen fumarate and alkylene oxide. All major processing equipment is shown but no attempt has been made to show all of the valves and pumps since the drawing is merely intended to be a flow diagram.

Alkyl hydrogen fumarate is charged by line 1 to water-cooled jacketed reactor 3 which is equipped with stirrer 4 driven by electric motor 5. Basic catalyst is charged to reactor 3 by line 2.

Air is purged from reactor 3 by repeatedly evacuating reactor 3 with vacuum ejector 7 connected to reactor 3 by line 8 and breaking the vacuum with inert gas admitted through line 6. After the air is purged, pressure in reactor 3 is adjusted to the predetermined operating level. Alkylene oxide is fed to reactor 3 through line 9 at the rate required to maintain the pressure in reactor 3 at the desired level. The temperature of the charge in reactor 3 is controlled by controlling the flow of cooling water to reactor 3. After the desired reaction of monoalkyl fumarate and alkylene oxide to give crude alkyl hydroxyalkyl fumarate has occurred, excess alkylene oxide is removed from reactor 3 via line 8 by applying vacuum to reactor 3 by vacuum ejector 7 and purging with inert gas admitted through line 6. The reaction mixture is cooled to a predetermined level by cooling reactor 3 with water.

The crude product is then drained from reactor 3 via line 10 to mix tank 11 which is equipped with agitator 12 driven by motor 13. A predetermined amount of organic solvent is charged to mix tank 11 through line 14 and mixed with the crude hydroxyalkyl fumarate ester. The solution thus formed is pumped forward from mix tank 11 along line 15 by pump 16 and into line 17.

Rate of flow is indicated by flow meter 18 connected to line 17 and is controlled by valve 20 connected to flow meter 18 by line 9. Line 21 connects valve 20 to the bottom compartment of liquid-liquid contactor 22.

A preferred contactor 16 for use in the processes of this invention is described in detail in U.S. 3,074,921 by one of the present inventors and consists of a vertical closed column 23 of circular cross-section and cylindrical shape having a coaxial rotor shaft 24 which is operated by motor 25. Fixed to rotor shaft 24 are a number of circular imperforate baffles 26 which are actually fifty in number in the particular apparatus used to obtain the data presented below. The inner wall of column 23 is equipped with annular horizontal stator rings 27 having circular central openings concentric with the rotor shaft 24. These stator rings 27 form a number, forty-eight in this case, of compartments. The inner diameter of the stator rings 27 is greater than the diameter of the rotor baffles 26 facilitating easy assembly or disassembly of the extraction column.

Any other type of liquid-liquid extraction equipment could be used instead of column 22 where preferred. Examples of such equipment are conventional mixing and settling tanks, spray columns and baffle plate columns as described by Coulson and Richardson (Chemical Engineering, vol. 2, p. 767, McGraw-Hill), pulsed columns as described by Treybal (Mass Transfer Operation, p. 380, McGraw-Hill), multistage mixer columns as described by Oldshue and Rushton (Chemical Engineering Progress, vol. 48, p. 297, 1952) and Scheibel (A. I. Ch. E. Journal, vol. 2, p. 74, 1956), packed columns as described by Treybal (op. cit., p. 374), spray columns as described by Treybal (op. cit., p. 371), perforated plate columns as described by Treybal (op. cit., p. 376), Podbielniak extractors as described by Treybal (op. cit., p. 382), etc.

Water is fed via line 28 to flow meter 29, and then to connecting line 30. Water flows by line 30 to control valve 31 and then by line 32 to the top compartment of liquid-liquid contactor 22. In some cases it is preferred that this water be saturated with the organic solvent.

Aqueous basic extractant solution is fed by line 33 to flow meter 34 and then by line 35 to control valve 36. Line 37 carries the wash solution from valve 36 to a point near the middle of liquid-liquid contactor 22.

The hydroxyalkyl fumarate solution proceeds upward through the column, countercurrent to the downcoming basic wash solution and water flows. The acidic impurities present in the crude alkyl hydroxyalkyl fumarate stream are extracted into the aqueous phase, principally in the section below the aqueous basic extractant solution inlet line 37. Residual water soluble materials pass into the aqueous phase above where line 37 connects to contactor 22. The aqueous phase effluent passes from the bottom of liquid-liquid contactor 22 via line 38 and contains materials which were removed from the crude alkyl hydroxyalkyl fumarate. The purified alkyl hydroxyalkyl fumarate stream passes out the top of contactor 22 through line 39, to a steam heated evaporator 40 where the major portion of the organic solvent is vaporized.

The evaporator 40 effluent flows by line 41 to vapor-liquid separator 42 where solvent vapor is separated from the fumarate stream. The purified alkyl hydroxyalkyl fumarate passes by line 43 through product cooler 44 and on to product storage by line 45. The solvent vapor passes by line 46 to condenser 47. The condensed liquid flows from condenser 47 by line 48 to liquid-vapor separator 49. The condensed organic solvent flows from liquid-vapor separator 49 via line 50 to storage for recycle in the process. The uncondensed gases from the liquid-vapor separator 49 pass by line 51 to vacuum ejector 52.

The process as described uses a solvent for the hydroxyalkyl fumarate which is less dense than water so that the fumarate solution can be fed near the bottom of the extraction column and flow upward against the downcoming basic wash solution, because by such operation impurities will not only be extracted from the organic phase but also undissolved material will tend to settle out and proceed down the column and out with the extracting medium. However, the reverse type of operation, i.e., where the organic phase is more dense than the extracting medium, can be used by introducing the hydroxyalkyl fumarate solution near the top of the extraction column.

The extraction column can be operated at atmospheric pressure or at super-atmospheric pressure, the latter being preferred if it is desired to run the column at increased temperatures or to use volatile solvents. Normally vacuum operation of the extraction column would not be preferred but it is possible that under some conditions, it would be the most desirable way to operate the column.

The extraction process is usually carried out in the temperature range from about zero degrees centigrade to one hundred degrees centigrade, however, higher or lower temperatures can be used depending on the particular solvent, the pressure, etc. The preferred temperature is from about twenty to forty degrees centigrade.

The ratio of the rate with which the hydroxyalkyl fumarate phase is fed to the extraction column to the rate of the combined water and buffer feeds should be on about the same order, i.e., about one to one. However depending on the concentrations of the feed solutions, the actual flow rates, the height of the column, etc., the above rate ratio may vary somewhat. It is important however, that the flow rates be controlled to maintain the liquid-liquid interface above the top compartment of the column and below the fumarate outlet line.

By way of summary our invention in its broadest aspect is directed towards the purification of hydroxyalkyl fumarate esters by aqueous extraction of acidic components with a basic wash having a certain pH range. Additionally the present invention has various specific embodiments which are advantageously employed in practicing the preferred processes.

EXAMPLE 1.—PREPARATION OF HYDROXY-ALKYL FUMARATE ESTERS

A.—*Bis(2-hydroxypropyl)fumarate*

To a reactor equipped with stirrer, thermometer, addition funnel, condenser, and a sampling port fitted with a rubber septum is charged 116 g. (1 mole) of fumaric acid, 116 g. (145 ml.) of methyl isobutyl ketone, and 3.1 g. (2 equivalent percent) of pyridine. One hundred twenty eight g. (2.2 moles) of propylene oxide is charged to the addition funnel. The apparatus is flushed with nitrogen and the reactor heated to ca. 90° C., with stirring. The propylene oxide is then added at a dropwise rate maintaining the temperature at ca. 90° C. After ca. 3 hours most of the fumaric acid has reacted and the solution begins to clear. At half hour intervals samples are taken through the septum by means of a hypodermic syringe fitted with a long needle and titrated with standard KOH solution. The acid number falls in the range from ca. 5–10 when a 5–10% excess of propylene oxide has been added and the reaction is stopped. After cooling to room temperature and removing the solvent the crude bis(2-hydroxypropyl) fumarate containing ca. 4% mono-hydroxypropyl fumarate is recovered.

B.—*Ethyl 2-hydroxyethyl fumarate*

To a reactor equipped with stirrer, thermometer, gas inlet adapter, sampling tube and outlet connected to a mercury manometer and mounted on a balance is charged 576 g. (4 moles) ethyl hydrogen fumarate and 5.5 g. (2 equivalent percent) anhydrous $K_2CO_3$. The apparatus is heated to ca. 70° C., to melt the ethyl hydrogen fumarate and flushed 3 times each with nitrogen and ethylene oxide by pressuring to ca. 115 cm. of mercury and venting. The reactor is heated to 80° C., and the stirrer started. Ethylene oxide is fed into the vessel to start the reaction and its flow is adjusted to hold the pressure at ca. 110 cm. of mercury. Reaction temperature is maintained at 80°–100° C., by means of an air stream played on the outside of the reactor. After approximately theoretical weight increase is recorded, a sample is taken and titrated with standard KOH solution to determine its acid number. This procedure is repeated at set intervals until the acid number is ca. 10–20. The flow of ethylene oxide is stopped and the reactor vented and flushed with nitrogen. After cooling a vacuum (ca. 20 mm. of mercury) is applied to the system to remove residual ethylene oxide and crude ethyl 2-hydroxyethyl fumarate containing ca. 4% ethyl hydrogen fumarate is obtained.

C.—*Bis(2-hydroxyethyl)fumarate*

The procedure employed in A is followed substituting ethylene oxide for propylene oxide.

D.—*Bis(2-hydroxybutyl)fumarate*

The procedure employed in A is followed substituting butylene oxide for propylene oxide.

E.—*Ethyl 2-hydroxypropyl fumarate*

The procedure emloyed in B is followed substituting propylene oxide for ethylene oxide.

F.—*Ethyl 2-hydroxybutyl fumarate*

The procedure employed in B is followed substituting butylene oxide for ethylene oxide.

G.—*Methyl 2-hydroxyethyl fumarate*

The procedure employed in B is followed substituting methyl hydrogen fumarate for ethyl hydrogen fumarate.

H.—*Isopropyl 2-hydroxyethyl fumarate*

The procedure employed in B is followed substituting isopropyl hydrogen fumarate for ethyl hydrogen fumarate.

I.—*n-Butyl 2-hydroxyethyl fumarate*

The procedure employed in B is followed substituting n-butyl hydrogen fumarate for ethyl hydrogen fumarate.

EXAMPLE 2.—PURIFICATION OF HYDROXYALKYL FUMARATE ESTERS BY BATCH PROCESS

A.—*Bis(2-hydroxypropyl)fumarate*

A 50 weight percent solution of 200 g. of crude bis(2-hydroxypropyl)fumarate (as prepared in Example 1, acid number ca. 6) in methyl isobutyl ketone is prepared, transferred to a separatory funnel, and washed with a $Na_2HPO_4$ solution, pH ca. 9, and salt solution according to the schedule given below:

(1) 1.33 equiv. amounts of 10% aqueous $Na_2HPO_4 \cdot 7H_2O$
(2) 150 g. of 5% aqueous KCl; and
(3) 150 g. of 5% aqueous KCl.

The methyl isobutyl ketone phase is separated and the methyl isobutyl ketone stripped off at reduced pressure to provide bis(2-hydroxypropyl)fumarate as a nearly colorless oil, substantially free of catalyst and unreacted fumaric acid. The purified product has an acid number less than ca. 1.0.

*Analysis.*—Calc'd for $C_{10}H_{16}O_6$; percent C, 51.7; percent H, 7.0; Sap. Eq., 116. Found: Values corresponding closely to theory.

B.—*Ethyl 2-hydroxyethyl fumarate*

One hundred grams of crude ethyl 2-hydroxyethyl fumarate (prepared as described in Example 1, acid number ca. 14) is dissolved in 100 g. (125 ml.) of methyl isobutyl ketone to give a 50 weight percent solution which is washed in a separatory funnel by shaking vigorously for 1 minute each with the following solutions:

(1) 1.33 equiv. amounts of 14.8% aqueous

plus 50 g. of 5% aqueous KCl;
(2) 50 g. of 5% aqueous KCl; and
(3) 50 g. of 5% aqueous KCl.

The $Na_2HPO_4$ wash used as a pH ca. 9.

Ethyl 2-hydroxyethyl fumarate is recovered by stripping off the methyl isobutyl ketone on a rotary evaporator over a water bath at 30°–35° C.

The purified product is substantially free of catalyst and unreacted ethyl hydrogen fumarate and has an acid number less than ca. 1.5.

*Analysis.*—Calc'd for $C_8H_{12}O_5$; percent C, 51.1, percent H, 6.4; Sap. Eq., 94. Found: Values corresponding closely to theory.

C.—*Bis(2-hydroxyethyl)fumarate*

A 66⅔ weight percent solution of bis(2-hydroxyethyl) fumarate reaction mixture (acid number ca. 10) is formed by adding 100 g. of the fumarate to 50 g. of methyl isopropyl ketone. The solution so formed is transferred to a separatory funnel and washed with $Na_2B_4O_7$ solution, pH ca. 9.5 and salt water in the following sequence:

(1) 1.33 equiv. amounts of 15% aqueous
$Na_2B_4O_7 \cdot 10H_2O$;
(2) 50 g. of 5% aqueous NaCl; and
(3) 50 g. of 5% aqueous NaCl.

The solvent is removed and purified product obtained containing minimal acid content.

*Analysis.*—Calc'd for $C_8H_{12}O_6$; percent C, 47.1; percent H, 5.9; Sap. Eq., 102. Found: Values corresponding closely to theory.

D.—*Bis(2-hydroxybutyl)fumarate*

To 200 g. of crude bis(2-hydroxybutyl)fumarate acid number 10–15, is added 300 g. of ethylene dichloride and the resulting solution washed as set forth below:

(1) 1 equiv. amount of 15% aqueous $Na_2CO_3$;
(2) 200 g. of 10% aqueous NaCl;
(3) 200 g. of 10% aqueous NaCl.

The pH of the $Na_2CO_3$ wash solution is ca. 11.5. The ethylene dichloride is distilled off and the purified bis(2-hydroxybutyl)fumarate is recovered substantially free of acidic components.

*Analysis.*—Calc'd for $C_{12}H_{20}O_6$; percent C, 55.4; percent H, 7.7; Sap. Eq., 130. Found: Values corresponding closely to theory.

E.—*Ethyl 2-hydroxypropyl fumarate*

One hundred grams of crude ethyl 2-hydroxypropyl fumarate, acid number 15–20, is treated with an equal weight of methylene chloride. The 50 weight percent solution thus formed is washed with sodium bicarbonate solution, pH ca. 8.5, and dilute salt solution as shown below:

(1) 1.66 equiv. amounts of 10% aqueous $NaHCO_3$;
(2) 50 g. of 10% aqueous KCl;
(3) 50 g. of 10% aqueous KCl;
(4) 50 g. of 10% aqueous KCl.

The methylene chloride is removed under reduced pressure leaving ethyl 2-hydroxypropyl fumarate substantially free of acidic impurities.

*Analysis.*—Calc'd for $C_9H_{14}O_5$: Percent C, 53.4; percent H, 6.9; Sap. Eq., 101. Found: Values corresponding closely to the stated values.

F.—*Ethyl 2-hydroxybutyl fumarate*

To 150 g. of crude ethyl 2-hydroxybutyl fumarate, acid number ca. 15, is added 200 g. of methyl isobutyl ketone. The solution thus formed is washed with $Na_2HPO_4$ solution (pH, ca. 9), water, and salt water as presented below:

(1) 1.33 equiv. amounts of 10% aqueous
$Na_2HPO_4 \cdot 7H_2O$;
(2) 200 g. of water;
(3) 150 g. of 5% KCl solution;
(4) 200 g. of water;
(5) 150 g. of 5% KCl solution.

The methyl isobutyl ketone is separated and pure ethyl 2-hydroxybutyl fumarate of low acid number, ca. 0.5, is recovered.

*Analysis.*—Calc'd for $C_{10}H_{16}O_5$: Percent C, 55.6; percent H, 7.4; Sap. Eq., 108. Found: Values closely corresponding to theory.

G.—*Methyl 2-hydroxyethyl fumarate*

To 100 g. of crude methyl 2-hydroxyethyl fumarate, acid number 10–15, is added 100 g. of methyl isobutyl ketone. The resulting ketone solution is washed with $Na_2B_4O_7$ solution (pH ca. 9.5) and salt water solution as set forth below:

(1) 1.33 equiv. amounts of 10% aqueous
$Na_2B_4O_7 \cdot 10H_2O$;
(2) 100 g. of 5% aqueous KCl;
(3) 100 g. of 5% aqueous KCl.

The methyl isobutyl ketone is distilled leaving substantially acid free methyl 2-hydroxyethyl fumarate.

*Analysis.*—Calc'd for $C_7H_{10}O_5$; percent C, 48.2; percent H, 5.7; Sap. Eq., 187. Found: Values closely corresponding to theory.

H.—*Isopropyl 2-hydroxyethyl fumarate*

To 100 g. of crude isopropyl 2-hydroxyethyl fumarate, acid number ca. 10, is added 150 g. of diisopropyl ether. The ether solution is washed with $Na_2HPO_4$ solution (pH ca. 9.0) and with salt solution as shown below:

(1) 2 equiv. amounts of 15% aqueous $Na_2HPO_4 \cdot 7H_2O$;
(2) 100 g. of 5% aqueous KCl; and
(3) 100 g. of 5% aqueous KCl.

The ether is removed under reduced pressure and the pure fumarate ester recovered substantially free of acidic components.

*Analysis.*—Calc'd for $C_9H_{14}O_5$; percent C, 53.4; percent H, 6.9; Sap. Eq., 101. Found: Values closely corresponding to theory.

I.—*n-Butyl 2-hydroxyethyl fumarate*

To 100 g. of crude n-butyl 2-hydroxyethyl fumarate, acid number 10–15, is added 100 g. of methyl isobutyl ketone. The ketone solution is washed with a basic solution, pH ca. 9, to extract acidic components and washed with salt water to insure complete extraction. The exact procedure is given below:

(1) 1 equiv. amount of 10% aqueous $Na_2HPO_4 \cdot 7H_2O$;
(2) 100 g. of 5% aqueous NaCl;
(3) 100 g. of 5% aqueous NaCl; and
(4) 100 g. of 5% aqueous NaCl.

The methyl isobutyl ketone is distilled from the organic phase and the desired product is obtained substantially free from acidic contaminants.

*Analysis.*—Calc'd for $C_{10}H_{16}O_5$: Percent C, 55.6; percent H, 7.4; Sap. Eq. 108. Found: Values closely corresponding to theory.

EXAMPLE 3.—PURIFICATION OF HYDROXYALKYL FUMARATE ESTERS BY CONTINUOUS PROCESS

A.—*Bis(2-hydroxypropyl)fumarate*

Thirty parts by weight of bis(2-hydroxypropyl)fumarate having an acid number of 15 is dissolved in 70 parts of methyl isobutyl ketone. This solution is charged at the rate of 20 lb./hr. to the bottom compartment of a 3 in. I.D. rotating disk contactor having a 40 in. high compartmented section. The rotor is operated at 305 r.p.m. A solution consisting of 26.5 parts by weight on the anhydrous basis of $Na_2HPO_4$ and 73.5 parts of water is charged to the middle of the contactor at the rate of 1.2 lb./hr. Water is charged to the top compartment of the contactor at the rate of 18.8 lb./hr.

The contactor is operated with the liquid-liquid interface above the top compartment; hence the fumarate-ketone phase is the dispersed phase and the aqueous phase is the continuous phase. The fumarate-ketone solution effluent from the top of the column contains minimal acidity. The acidic impurities are contained in the aqueous phase effluent from the bottom of the column.

B.—*Ethyl 2-hydroxyethyl fumarate*

Thirty-five parts by weight of ethyl 2-hydroxyethyl fumarate having an acid number of 12 is dissolved in 65 parts methyl isobutyl ketone. This solution is charged at the rate of 25.5 lb./hr. to the bottom compartment of a 3 in. I.D. rotating disk contactor having a 40 in. high compartmented section. The rotor is operated at 280 r.p.m. A solution consisting of 26.5 parts by weight on the anhydrous basis of $Na_2HPO_4$ and 73.5 parts water is charged to the middle of the contactor at the rate of 1.3 lb./hr. Water is charged to the top compartment of the contactor at the rate of 7.2 lb./hr.

The contactor is operated with the liquid-liquid interface above the top compartment; hence the fumarate-ketone phase is the dispersed phase and the aqueous phase is the continuous phase. The fumarate-ketone solution effluent from the top of the column contains minimal acidity. The acidic impurities are contained in the aqueous phase effluent from the bottom of the column.

What is claimed is:

1. A process for purifying hydroxyalkyl fumarate diesters which comprises dissolving hydroxyalkyl fumarate diesters in which the hydroxyalkyl group has 2 to 4 carbon atoms with the hydroxy group in the 2-position in an inert organic solvent selected from the group consisting of aromatic hydrocarbons, chlorinated alkanes, lower dialkyl ketones, alcohols and ethers, the said solvent being further limited to having a water solubility of less than about fifteen weight percent, and washing the resulting solution with a basic aqueous solution having a pH from about eight to twelve until there has been a substantial purification of the said hydroxyalkyl fumarate diester, the base being selected from alkali metal and ammonium salts giving aqueous solutions of the specified pH.

2. The process of claim 1 in which a 10 to 90% by weight solution of the said diester is formed and washed with a basic aqueous solution buffered to a pH of about 8 to 10.

3. The process of claim 1 in which the fumarate is ethyl hydroxyethyl fumarate and the salt is disodium hydrogen phosphate.

4. The process of claim 1 in which the fumarate ester is a bis(hydroxyalkyl)fumarate.

5. The process of claim 1 in which there is dissolved crude alkyl 2-hydroxyalkyl fumarate in an inert organic solvent which solvent is substantially immiscible with water to form a solution which contains from about twenty-five to seventy-five weight percent of alkyl 2-hydroxyalkyl fumarate and washing the alkyl 2-hydroxyalkyl fumarate solution so prepared with one to about two equivalent amounts of a basic aqueous solution buffered to a pH value within the range from about eight to ten which wash solution contains from about five to fifty weight percent of buffer.

6. The process of claim 5 where the alkyl 2-hydroxyalkyl fumarate is ethyl 2-hydroxyethyl fumarate.

7. A process for purifying hydroxyalkyl fumarate diesters in which the hydroxyalkyl group has 2 to 4 carbon atoms which comprises subjecting crude hydroxyalkyl fumarate diesters in which the hydroxyalkyl group has 2 to 4 carbon atoms with the hydroxy group in the 2-position in a twenty-five to seventy-five weight percent solution in an inert organic solvent selected from the group consisting of aromatic hydrocarbons, chlorinated alkanes, and lower dialkyl ketones, the said solvent having a water solubility of less than about fifteen weight percent, to counter-current washing with a basic aqueous solution buffered to a pH value of about 8 to 10, the aqueous solution contacted having sufficient equivalents of base to at least neutralize the acidic components, the base being selected from the group consisting of alkali metal and ammonium salts giving aqueous solutions of the specified pH.

8. The process of claim 7 in which continuous counter-current multistage extraction is employed, and a water wash solution is added at a stage subsequent to the basic aqueous solution and permitted to flow through all previous stages.

9. The process of claim 8 in which the water wash contains water soluble salts of a strong acid and strong base.

10. The process of claim 7 in which the base is disodium hydrogen phosphate and the organic solvent has water solubility of less than about 5 weight percent.

11. The process of claim 7 in which the base is disodium hydrogen phosphate, the fumarate is ethyl hydroxyethyl fumarate and the solvent is methyl isobutyl ketone.

12. The process of claim 7 in which the fumarate is ethyl hydroxyethyl fumarate.

References Cited

FOREIGN PATENTS 711,211 6/1954 Great Britain.
758,243 10/1956 Great Britain.

LORRAINE A. WEINBERGER, *Primary Examiner.*

I. R. PELLMAN, *Examiner.*

R. K. JACKSON, *Assistant Examiner.*